(12) United States Patent
Slowiak et al.

(10) Patent No.: US 11,438,331 B1
(45) Date of Patent: Sep. 6, 2022

(54) DIGITAL IDENTITY SIGN-IN

(71) Applicant: Early Warning Services, LLC, Scottsdale, AZ (US)

(72) Inventors: Gregory Slowiak, Chicago, IL (US); Eric Woodward, San Francisco, CA (US); Philip Lam, San Francisco, CA (US); Jeff Shultz, Waco, TX (US)

(73) Assignee: Early Warning Services, LLC, Scottsdale, AZ (US)

( * ) Notice: Subject to any disclaimer, the term of this patent is extended or adjusted under 35 U.S.C. 154(b) by 262 days.

(21) Appl. No.: 16/908,453

(22) Filed: Jun. 22, 2020

Related U.S. Application Data

(60) Provisional application No. 62/864,906, filed on Jun. 21, 2019, provisional application No. 62/864,891, filed on Jun. 21, 2019, provisional application No. 62/864,911, filed on Jun. 21, 2019, provisional application No. 62/864,900, filed on Jun. 21, 2019, provisional application No. 62/864,889, filed on Jun. 21, 2019.

(51) Int. Cl.
*H04L 9/40* (2022.01)
*G06F 9/445* (2018.01)

(52) U.S. Cl.
CPC .......... *H04L 63/0884* (2013.01); *G06F 9/445* (2013.01); *H04L 63/0876* (2013.01)

(58) Field of Classification Search
CPC .. H04L 63/0884; H04L 63/0876; G06F 9/445
See application file for complete search history.

(56) References Cited

U.S. PATENT DOCUMENTS

| 10,069,811 B2 | 9/2018 | Curtis et al. |
| 10,237,259 B2 | 3/2019 | Ronda et al. |
| 10,853,791 B1 | 12/2020 | Ellis et al. |

(Continued)

FOREIGN PATENT DOCUMENTS

CA          3074350 A1     9/2020

OTHER PUBLICATIONS

U.S. Appl. No. 16/908,460 received a Notice of Allowance, dated Jan. 12, 2022, 10 pages.

(Continued)

*Primary Examiner* — Huan V Doan
(74) *Attorney, Agent, or Firm* — Kilpatrick Townsend & Stockton LLP

(57) ABSTRACT

Disclosed herein is an identity network that provides a universal, digital identity for users to be authenticated by an identity provider for relying parties upon sign-in to the relying party. The identity network receives the sign-in request from a relying party for a user using a user device. The identity network can provide a session identifier to the relying party for the request and launch an identity provider application associated with the user via a software development kit in the relying party application. The user may sign-in to the identity provider via the software development kit, thereby authenticating the user for the relying party. Additionally, the identity provider may generate a risk validation score and provide it to the relying party that provides a confidence value that the user is validly using the user device and a risk score based on device activity on the identity network.

20 Claims, 6 Drawing Sheets

(56) References Cited

U.S. PATENT DOCUMENTS

| | | |
|---|---|---|
| 11,157,954 B1 | 10/2021 | Belanger et al. |
| 2010/0145861 A1 | 6/2010 | Law et al. |
| 2010/0154046 A1 | 6/2010 | Liu et al. |
| 2013/0036456 A1 | 2/2013 | Boysen et al. |
| 2014/0173754 A1 | 6/2014 | Barbir |
| 2015/0332029 A1 | 11/2015 | Coxe et al. |
| 2017/0186084 A1 | 6/2017 | Koch |
| 2017/0244676 A1* | 8/2017 | Edwards ................. H04L 63/08 |
| 2017/0257358 A1* | 9/2017 | Ebrahimi .............. H04L 63/061 |
| 2018/0152440 A1 | 5/2018 | Hande et al. |
| 2018/0267847 A1 | 9/2018 | Smith et al. |
| 2019/0261169 A1 | 8/2019 | Kamal et al. |
| 2020/0213297 A1 | 7/2020 | Suraparaju |
| 2020/0366671 A1 | 11/2020 | Larson et al. |
| 2021/0014218 A1 | 1/2021 | Kurylko et al. |
| 2021/0320799 A1 | 10/2021 | Bankston |
| 2021/0326426 A1 | 10/2021 | Bouse |

OTHER PUBLICATIONS

U.S. Appl. No. 16/908,435 received a Notice of Allowance, dated Mar. 17, 2022, all pages.
U.S. Appl. No. 16/908,435 received a Non-Final Office Action, dated Nov. 2, 2021, 14 pages.
U.S. Appl. No. 16/908,443 received a Non-Final Office Action, dated Nov. 9, 2021, 14 pages.

* cited by examiner

DIGITAL IDENTITY SIGN-IN

RELATED APPLICATIONS

This application claims the benefit of and priority to, pursuant to 35 USC § 119, U.S. Provisional Application No. 62/864,891, filed Jun. 21, 2019, entitled "DIGITAL IDENTITY," U.S. Provisional Application No. 62/864,900, filed Jun. 21, 2019, entitled "DIGITAL IDENTITY SIGN-UP," U.S. Provisional Application No. 62/864,906, entitled "DIGITAL IDENTITY SIGN-IN," U.S. Provisional Application No. 62/864,911, entitled "DIGITAL IDENTITY STEP-UP," and U.S. Provisional Application No. 62/864,889, entitled "DIGITAL IDENTITY LOCK," each of which is assigned to the assignee hereof, and each of which are incorporated herein in their entirety by reference for all purposes.

U.S. patent application Ser. No. 16/908,435, filed concurrently herewith, entitled "DIGITAL IDENTITY," U.S. patent application Ser. No. 16/908,443, filed concurrently herewith, entitled "DIGITAL IDENTITY SIGN-UP," U.S. patent application Ser. No. 16/908,456, filed concurrently herewith, entitled "DIGITAL IDENTITY STEP-UP," and U.S. patent application Ser. No. 16/908,460, filed concurrently herewith, entitled "DIGITAL IDENTITY LOCK," are each incorporated by reference in their entirety for all purposes.

BACKGROUND

Most companies have an online presence today and each has information about each of its users and customers. However, authentication of a user is largely handled piecemeal by each company with little verification of the user by a trusted source. The current way that users are onboarded and authenticated lacks security, consistency, and ease of use for both the companies and the users. Additionally, current methods to perform identity verification online have considerable drawbacks in coverage, validity and usability.

SUMMARY

Figure 1:
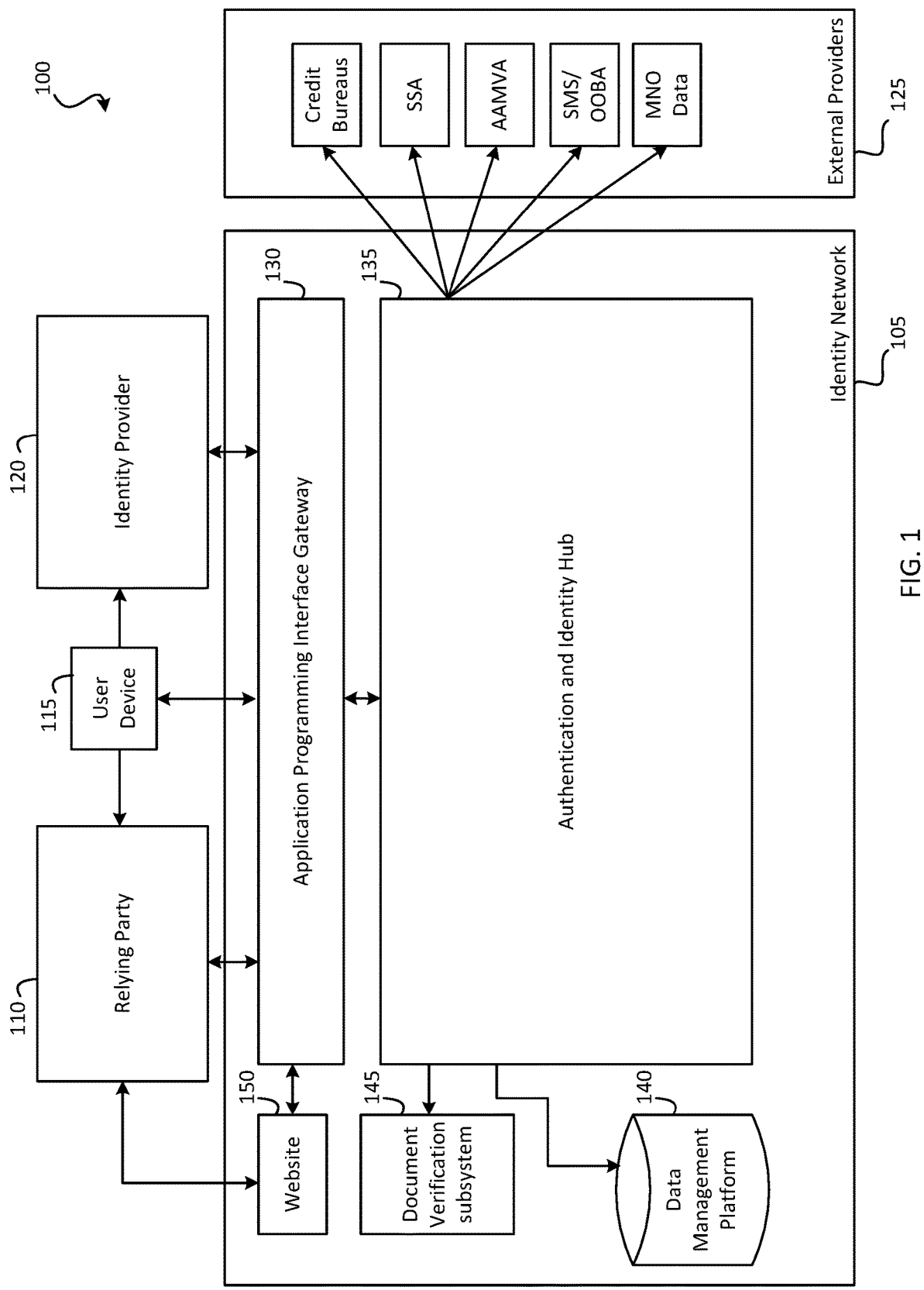
FIG. 1 illustrates an example system for providing an authenticated, universal digital identity for a user, according to an embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for sign-in using a universal digital identity using an identity network. The identity network may receive a sign-in request for a user of a user device from a relying party. The identity network may provide a session identifier to the relying party and launch, using a software development kit of a relying party application, an identity provider application of an identity provider, where launching the identity provider application includes providing the session identifier. The identity network may receive from the identity provider, confirmation of a digital identity of the user including the session identifier and a digital signature of the user device. The identity network may receive, from the relying party, a confirmation request that indicates the identity provider authenticated the user, the confirmation request including the session identifier. In response to receiving the confirmation request, the identity network may provide the session identifier and the digital signature of the user device to the relying party. Other embodiments of this aspect include corresponding computer systems, apparatus, and computer programs recorded on one or more computer storage devices, each configured to perform the actions of the methods.

Implementations may include one or more of the following features. Optionally, the identity network may receive, from the identity provider, a request for device validation that includes the session identifier. The identity network may provide device validation information to the identity provider. Providing device validation information to the identity provider may include identifying a device identifier for the device and providing the device identifier and the session identifier to the identity provider. Optionally, the identity network may receive a detail request from the identity provider and, in response, transmit details of the sign-in request to the identity provider. Optionally, the identity network may receive via the software development kit of the relying party application, consent from the user. Optionally, the identity network may compare the digital signature of the user device with a stored digital signature for the user device an indication of the comparison result to the identity provider. Optionally, the identity network may perform risk validation of the user and the user device using the digital signature of the user device and transmit a risk validation score with the session identifier and the digital signature of the user device to the relying party. Performing risk validation may include obtaining stored activity associated with the digital signature of the user device and applying a model to the stored activity and sign-in request to generate the risk validation score. Performing risk validation may include obtaining the stored activity associated with the digital signature of the user device, applying a model to the stored activity and the sign-in request to generate a confidence value of the digital identity of the user, and transmit the confidence value with the session identifier and the digital signature of the user device to the relying party. Implementations of the described techniques may include hardware, a method or process, or computer software on a computer-accessible medium.

DETAILED DESCRIPTION

The explosion of online user activity and data over the past decades have resulted in a disparate system in which most online companies have developed their own systems for users to sign-up, sign in, and utilize their services. Authentication of users is often difficult to ensure that online identity theft and other sinister activities are avoided. Further, the process for creation of new accounts and tracking of countless passwords for users is tedious.

To solve the problem of invalid authentication and password security for users, described herein is a system for an authenticated, universal digital identity that a user may use to sign-in to accounts with relying parties of the system. The identity network that allows a user to sign in to an account for a relying party using authentication from an identity provider solves the technical problem faced by many online companies that a user may provide information to create an account or secure a password system such that the user is authenticated on signing in with more than a basic password. The company has no really secure way to verify or authenticate the user. Companies cannot be sure that existing users are verified other than through their own password systems, which suffer from password theft issues and invalid initial sign up. Accordingly, the technical solution described herein provides a consistent and technical way for the company to authenticate the user using a universal online digital identity.

Users often have a trusted relationship with their banks, and banks are regulated so certain precautions are taken by banks to ensure the user is a legitimate and authenticated user. Banks and other providers that have regulated processes for identifying users may be used to authenticate users with a digital identity authentication and provide information on the users for relying companies by becoming an identity provider in the disclosed identity network. Relying companies, such as insurance companies, retailers, and so forth can enroll with the identity network to gain the benefit of the identity provider authenticating the digital identity of users and customers and providing verified information upon account sign-in for a new customer. The identity network can broker authentication and information exchange using cryptographic technology and other verifiable methods between the relying party and the identity provider. Additional technological value can be provided by the identity network which can oversee and identify suspicious activity overall for a device or user, obtain information from various third parties for the relying party to further validate the user, and so forth.

FIG. 1 illustrates an example digital identity system 100 for authenticated, universal digital identities for users. System 100 includes an identity network 105, relying party 110, user device 115, identity provider 120, and external providers 125. Components or functionality described may be combined into fewer components or expanded into more components without departing from the scope of the invention.

Identity network 105 may include a network of one or more computers, such as computing device 600. The identity network 105 may include application programming interface gateway 130, authentication and identity hub 135, data management platform 140, document verification subsystem 145, and website 150. Identity network 105 may include other components or functionality than discussed or functionality may be combined into fewer or more components without departing from the scope of the invention. Identity network 105 provides the functionality to broker authentication and information exchange between the relying party 110 and the identity provider 120 as discussed in more detail herein.

Application programming interface gateway 130 provides a gateway for the relying party 110, user device 115, identity provider 120, and the website 150 to interact with the authentication and identity hub 135. The authentication and identity hub 135 interfaces between various components and collects information needed for identity assertions. For example, authentication and identity hub 135 may collect information from external providers 125 including, for example, credit bureaus, the social security administration, the American association of motor vehicle administrators, and other external providers that utilize out-of-band authentication (e.g., secure message service out-of-band authentication), and/or mobile network operator data. Various data from external providers may be used depending on the request from the relying party 110, which will be described in greater detail with respect to FIG. 2.

Authentication and identity hub 135 also interfaces with the document verification subsystem 145 for verifying documents. The document verification subsystem 145 may be a third party subsystem or may interface with a third party subsystem in some embodiments. The authentication and identity hub 135 may interface with the document verification subsystem 145 using an application programming interface. The document verification subsystem enables the identity network 105 to request a standard identity document from an end user on user device 115. The standard identity document may be, for example, a driver license, state-issued identification, or country-issued passport. The document verification subsystem 145 can validate the document presented by the user is a legitimate document, that the identity attributes match those of the identity provider 120 for the given user, and that the document photo matches the end user holding the document. The document verification subsystem 145 can also verify data submitted by an end user against data found on authoritative documents such as a state issued driver license or a United States Passport, for example. In some embodiments, when a user submits data or information using user device 115, the authentication and identity hub 135 may provide the data to the document verification subsystem 145 in conjunction with information from an external provider 125. The document verification subsystem 145 can extract information from the documents provided from the external providers 125 and compare it to the data the user provided. For example, the user may provide a driver license number, and the document verification subsystem 145 may extract the user's driver license number from the user's driver license obtained from an external provider 125 (e.g., the state department of motor vehicles) and compare the two values to ensure the user entered data is accurate.

Authentication and identity hub 135 also interfaces with data management platform 140. Data management platform 140 can provide, for example, identity reputation scores and/or device reputation information. For example, the identity network 105 may identify based on a common device id (described in more detail with respect to FIG. 4) activity of a device at one or more identity providers 120 and/or one or more relying parties 110. This activity can be modelled and compared to models that may indicate whether the activity the device is engaging in is suspicious. If suspicious activity is detected, new requests may be flagged for the relying party 110 requesting the information or authentication. Similar to device reputation, identity reputation models capture network behavior of a given user to determine inconsistencies that correlate to potential fraud. The identity reputation and/or the device reputation information may be used to generate an identity confidence score used to help a relying party determine if the confidence is sufficient to proceed with the relying party use of the digital identity or if the relying party may instead, for example, require additional authentication information from the user.

The authentication and identity hub 135 can interface with the data management platform 140 using an application programming interface.

Website 150 may be an internet interface provided by identity network 105 that a relying party 110 may redirect the end user, for example, to select their identity provider 120 when a request is initiated. Website 150 may redirect the user to their identity provider 120 website or mobile application via a matrix barcode (e.g., a QR code), a deep link, a website link, or via a short message service (SMS) or mobile push notification. In some embodiments, the relying party 110 may include a software development kit from the identity network 105 that is used to redirect the user to the website 150 to select the user's identity provider 120 when a request is initiated.

Authentication and identity hub 135 may communicate digital identity data that is obtained from the identity provider 120 to the relying party 110 when the identity network 105 fulfills an identity assertion. An identity assertion may be an authentication request in which the relying party 110 requests that the identity provider 120 validate or authenticate the digital identity of the user. The authentication request is sent to the identity network 105 from the relying party 110 and forwarded to the identity provider 120 by the identity network 105.

Data management platform 140 is used to provide ledger functionality (e.g., distributed or non-distributed ledger or hyper ledger functionality) to identity network 105. The ledger may store a registered identifier for each user registered to a particular identity provider 120. It may also be used to create a record of instance of the sharing of identity attributes from identity provider 120 to a relying party 110 on behalf of an end user. Each request and response for authentication and digital identity data may be passed through the authentication and identity hub 135 to store every transaction in the ledger.

Digital identity data may be provided from the identity provider 120 to the authentication and identity hub 135. The hub may provide the digital identity information to the relying party 110.

Relying party 110 may be any company that would like to be able to authenticate the digital identity of a user. Examples of relying parties 110 include insurance companies, retailers, travel companies (e.g., airlines, hotels, cruise lines), and the like. While only a single relying party 110 is depicted in FIG. 1 for the sake of simplicity of explanation, any number of relying parties 110 may be included in system 100.

Figure 6:
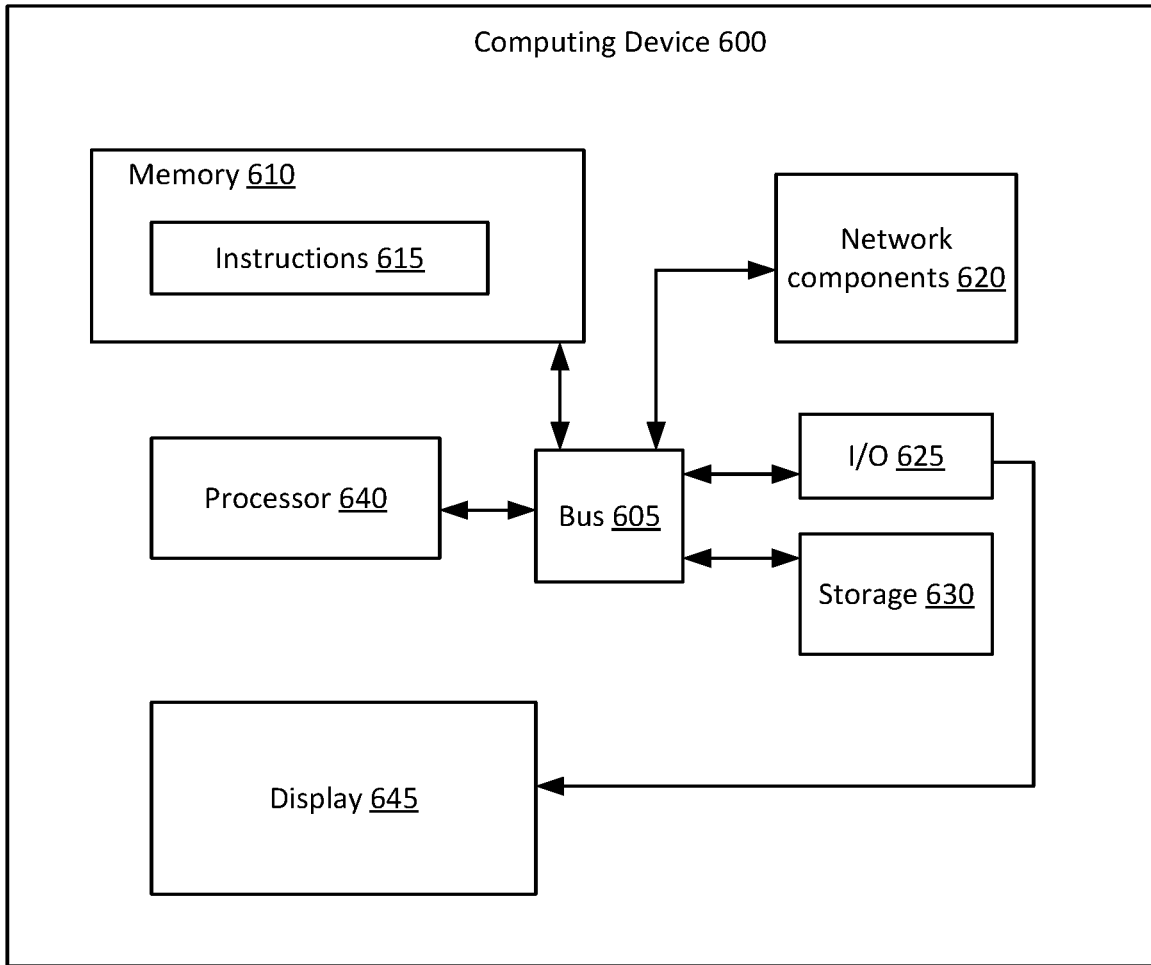
FIG. 6 illustrates an example computer system.

User device 115 may be any suitable computing device, such as computing device 600, as depicted and described with respect to FIG. 6, of a user. For example, user device 115 may be a laptop, smartphone, desktop computer, tablet, smartwatch, and the like. While only a single user device 115 is depicted in FIG. 1 for the sake of simplicity of explanation, any number of user devices 115 may be included in system 100.

Identity provider 120 may be any suitable company that can authenticate a user having user device 115 for relying party 110. Identity provider 120 may include, for example, financial institutions. Identity provider 120 may have detailed information and have verified the identity of the user of user device 115 because, for example, financial institutions are regulated by the government with respect to identifying customers with specificity. While only a single identity provider 120 is depicted in FIG. 1 for the sake of simplicity of explanation, any number of identity providers 120 may be included in system 100.

In use, a user may access a relying party 110 website using the user device 115. For example, the user may wish to initiate a new relationship with the relying party 110 to, for example, become a customer of the relying party 110. The relying party 110 may request digital identity authentication and information for the user of user device 115 from identity network 105 via website 150. In some embodiments, user device 115 may access a mobile application of relying party 110. The mobile application may access website 170 with an identity assertion. In response, the website 150 may provide a list of identity providers 120 for the user to select for authenticating the user's digital identity. The list may include many identity providers 120, and the user should select an identity provider with which the user has a relationship. For example, if the user is a customer of BankA, and BankA is an identity provider in the list, the user may select BankA as the identity provider for authenticating that user's digital identity. If the user has a relationship with multiple identity providers 120, the user may select any one of the identity providers 120 with which the user has a relationship. Once the user selects an identity provider 120, the application programming interface gateway 130 may receive the identity assertion including requested data about the user and the selected identity provider 120 and provide the entire request to the authentication and identity hub 135. The authentication and identity hub 135 may then provide the identity assertion to the identity provider 120. The identity provider 120 can authenticate the digital identity of the user and provide the requested information via the application programming interface gateway 130 to the authentication and identity hub 135. The authentication and identity hub 135 may obtain other information requested by the relying party 110 but not included from the identity provider 120. The authentication and identity hub 135 may request and obtain the information from the external providers 125, for example. Once the information is complete, the authentication and identity hub 135 may provide the information and acknowledgement of the authentication of the user's digital identity the relying party 110. If the identity provider 120 cannot authenticate the digital identity of the user, the identity provider 120 can provide such failed authentication notice to the authentication and identity hub 135, and the authentication and identity hub 135 can inform the relying party 110 of the failed authentication.

Figure 2:
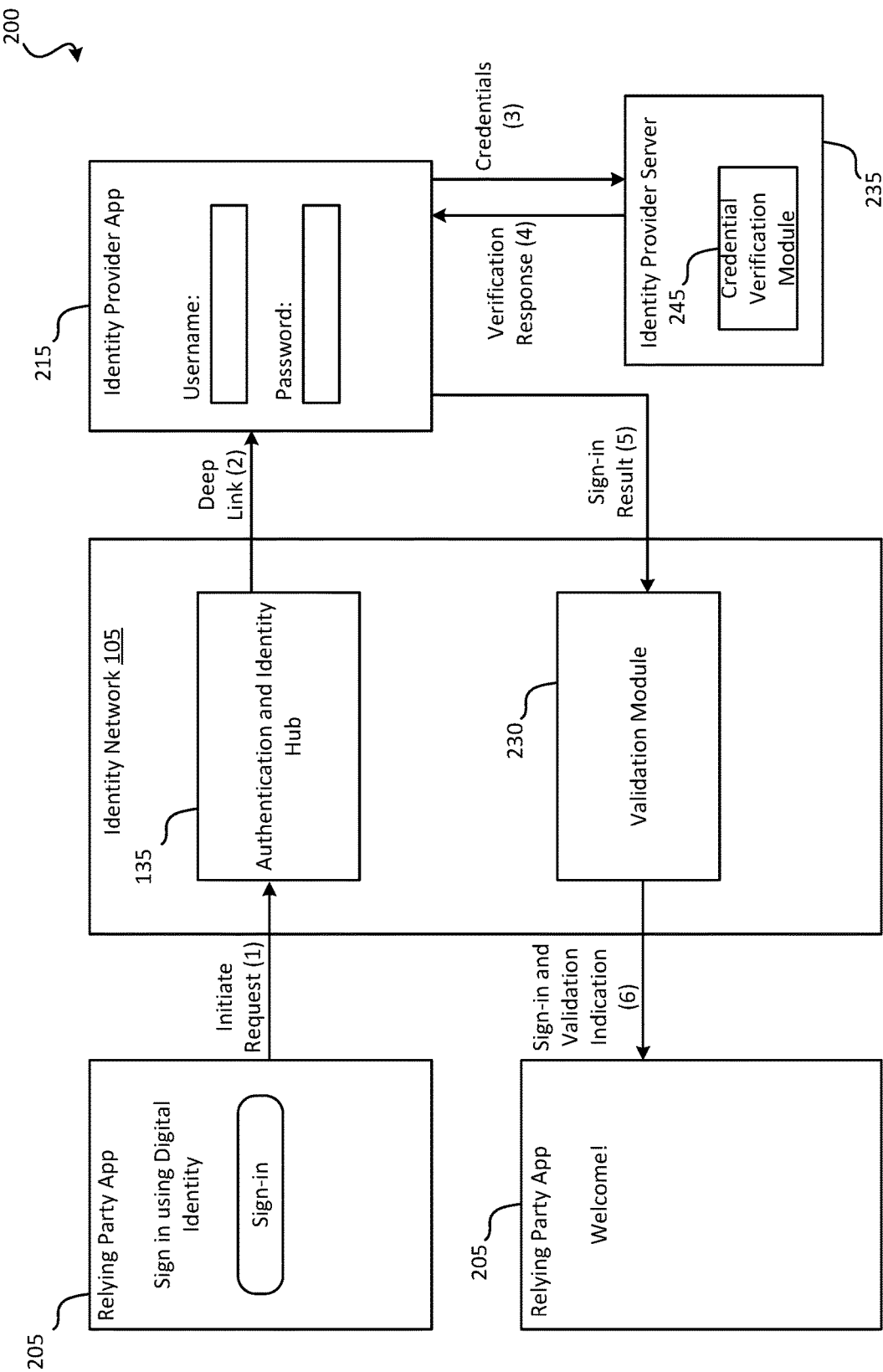
FIG. 2 illustrates an example data information flow using an authenticated, universal digital identity for a user, according to an embodiment.

FIG. 2 illustrates an example data flow 200 during sign-in to a relying party application 205 for a user of a user device. The data flow 200 begins with the user accessing the relying party application 205. The user has already created an account with the relying party, using the user's digital identity, and would like to sign-in to the relying party application 205. The relying party application 205 can be a mobile application or a web-based/browser application. The relying party app 205 can include an option to sign-in using the user's digital identity with the identity network 105. Upon selection of using the digital identity sign-in, the relying party app 205 can initiate the request by sending the sign-in request to the identity network 105 (Initiate Request (1)).

The authentication and identity hub 135 of the identity network 105 receives the request and identifies the user based on the request. The identity network 105 creates a session identifier that is used throughout the sign-in process. The identity network 105 may provide the session identifier to the relying party application 205. The identity network 105, via a software development kit on the relying party app 205, launches the identity provider app 215 (Deep Link (2)). The identity network 105 knows which identity provider to access based on a correlation in the authentication and identity hub 135 that was generated when the user signed-up with the relying party app 205 and selected an identity provider to use to validate that user's digital identity. For example, when the user signs up and requests an identity provider 120 to authenticate the user, a token may be received and saved in the authentication and identity hub 135 for the user/identity provider relationship so that upon later requests to authenticate, the token can be identified in the authentication and identity hub 135 and the same identity provider used. In some embodiments, the token is provided by the user with the selection of the identity provider, in some embodiments, the identity provider may provide the token upon first request by the identity network 105 to authenticate the user with the identity provider, or in some embodiments, the identity network may generate a token for storing the user/identity provider relationship. A deep link for mobile apps or a redirect for browser apps is used to launch the identity provider app 215. The deep link includes the session identifier generated by the identity network 105 for the sign-in of this user with the relying party application 205. The user signs into the identity provider app 215 as normal in order to validate him or herself. The credentials entered by the user (e.g., username/password, fingerprint, faceprint, iris scan, or the like) in the identity provider app 215 are sent to the identity provider server 235 (Credentials (3)). The credential verification module 245 verifies the credentials of the user and sends a verification response to the identify provider application 215 (Verification Response (4)). The sign-in result is transmitted from the identity provider app 215 to the identity network 105 (Sign-In Result (5)). The sign-in result that is transmitted may be encrypted and/or may be an indication of a successful login (i.e., validation of authentication) or an indication of a failed login (i.e., denial of access).

The validation module 230 of the identity network 105 receives the sign-in result and validates the user and/or the user's device. For example, the device ID of the device used for sign-in may be used to validate suspicious activity for the user's device. As an example of suspicious activity, if a user typically logs in three times each day to a set of relying party applications, and the sign-in is the 16$^{th}$ sign-in for the day, the validation module 230 may flag the activity as suspicious. The sign-in result and validation information is provided to the relying party app 205 (Sign-In and Validation Indication (6)). The relying party app 205 then determines how to proceed. The relying party may, for example if suspicious activity is flagged, require additional authentication from the user to confirm that the user is, in fact, the holder of the digital identity. In some embodiments, the relying party app 205 may determine that the validation of authentication from the identity provider application 215 (i.e., sign in results if validated) are sufficient to confirm that the user is, in fact, the holder of the digital identity.

Figure 3:
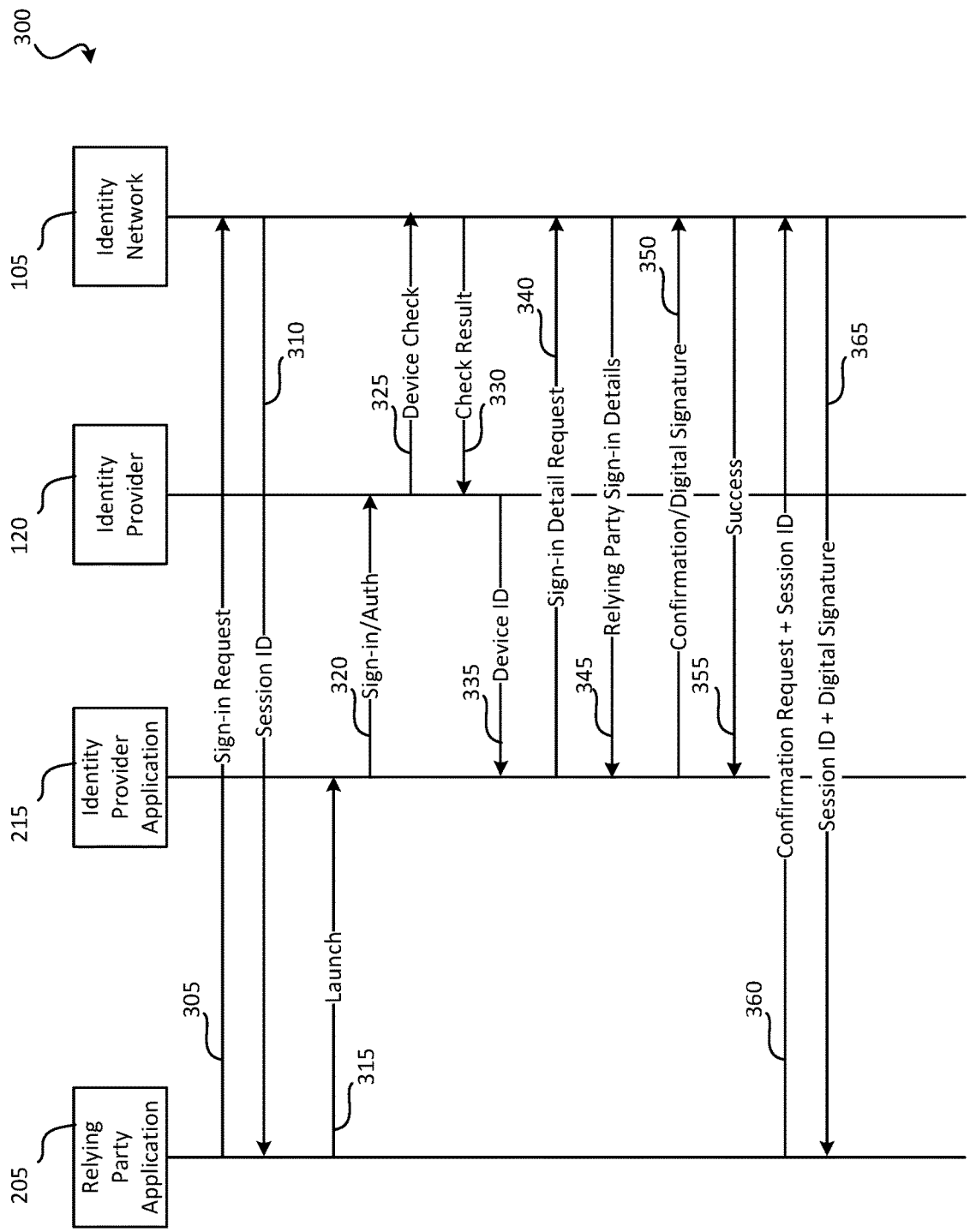
FIG. 3 illustrates an example swim diagram for a sign-up flow according to an embodiment.

FIG. 3 illustrates an example swim diagram 300 showing messaging and activities between components in the system 100 for a user sign-in to a relying party 110 using the authenticated digital identity with an identity provider 120 and the identity network 105. The activities begin with the relying party application 205 sending a sign-in request to the identity network 105 as shown by arrow 305. The identity network 105 may generate a session ID for the sign-in request as shown by arrow 310. In addition the identity network 105 may identify an identity provider 120 for the user that the sign-in request refers to. For example, the user may be associated with a specific identity provider 120, which the user may have selected during sign-up. That identity provider 120 will then authenticate the user when the user opts to use a digital identity.

At arrow 315, a software development kit previously provided by the identity network 105 is used to launch the identity provider application 215 via the relying party application 205. In the meantime, the relying party application 205 may display a QR code or deep link that has the session identifier embedded within.

The identity provider application 215 will provide a sign-in for the user, which the user will log into as shown at arrow 320. The identity provider 120 authenticates the user with the sign-in credentials. The identity provider 120 further completes a device check as shown by arrow 325 with the identity network 105. For example, a device specific number that may include a portion of the subscriber identity module (SIM) card number and other values that create a unique identifier for the device used by the user to sign-in may be used to confirm that the device is validated. The device is validated by the identity network 105 if it is associated with the user in a data store such that the device was previously used for the user in the identity network. If the device has not previously been used, the identity network 105 may make an entry for the device in the data store and associate the user with the device. Examples of information that can be used to identify the device can include using the SIM card in combination with a record of applications installed and/or photo storage, the SIM card and mobile network operator (MNO) account data, a serial number, and so forth. The device check identifies the device through hardware, software, data stored on the device, network connection information, mobile provider accounts, or any combination thereof. The identity network 105 can provide an indication of the results of the device check at arrow 330. Within the identity network 105 data store, the device may have a unique device identifier, which may be the same or different from the information used to identify the device. The device identifier can be sent from the identity provider 120 to the identity provider application 215 as shown by arrow 335. That device identifier may be used in addition to the session identifier for further validation of the messaging.

Once the user has successfully signed into the identity provider application 215, the user may use the identity provider application 215 to scan the QR code (perhaps displayed on a user computer screen), which contains the session ID. In response to scanning the code, the sign-in details are requested from the identity network 105 as shown by arrow 340. The request at arrow 340 may serve as a confirmation that the identity provider is validating the authentication of the user's digital identity because to obtain the code that results in the request the user had to successfully login to the identity provider. The relying party details of the sign-in request are sent to the identity provider application 215 as shown by arrow 345.

Once these sign-in request details are provided to the identity provider application 215, the identity provider application 215 can request confirmation (e.g., consent) that the identity provider application 215 can be used to sign-in to the relying party application 205. The user's consent can be requested using the software development kit provided by the identity network via the identity provider application. The confirmation, if received from the user, is sent to the identity network 105 including a digital signature, which is specifically associated with the user's device as shown at arrow 350. If the digital signature matches the digital signature the identity network 105 has on file for the user's device, a success confirmation is returned to the identity provider application at arrow 355.

Note that one or more identifiers may be used to track and/or protect the request and/or the user data in response to the request. For example, the session ID can be used to track the validation and the communication and data transfer between the relying party and the identity provider. The session ID is generated at the beginning when the sign-in request is received by the identity network. The session ID may then be transmitted with each communication between the identity network 105, the relying party application 205, and the identity provider 120, which allows each party to track the session and link the requested information and validation of each party with other information for that sign-in request (i.e., session). Further the identity provider 120 and relying party application 205 do not need to specifically know what data is requested or sent with the use of the session ID because the identity network 105 can handle that portion. The identity network 105 can tie the relying party request to the session ID and the identity provider 120 can confirm that it has the proper user information to satisfy the relying party application 205 needs using the session ID without disclosing to the identity provider 120 what the relying party application 205 is requesting.

The digital signature may be a token or credential that is specific to the user. When the user signs a message with the digital signature, it provides confirmation that the user has sent the message. In this way, the identity network 105 can validate that the proper user is sending the consent. The digital signature can be stored on a network device such that a user may digitally sign a message without having to be on a specific device. The digital signature is, therefore, tied to a user rather than a device.

The mobile ID (device identifier) may identify the device being used, and is therefore tied to a device. The specific activity of a device may be relevant to identify if abnormal behavior is exhibited, which may suggest a lost or stolen device. The mobile ID may be useful for the device check discussed above.

The relying party application 205, in response to a time limit and/or after the QR code is read, transmits a confirmation request that includes the session ID as shown by arrow 360. The identity network 105 then validates the user device, using the digital signature, to ensure that there has not been suspicious activity of the user's device that should be flagged. For example, if the user signs into the same or multiple relying party applications 205 in a non-standard pattern that is generated based on previous activity of that user device, the identity network 105 may flag the suspicious activity to the relying party application 205. If the identity network 105 has sent confirmation at arrow 355 of success to the identity provider application 215, the session ID and digital signature are sent to the relying party application 205 in response to the confirmation request as shown by arrow 365. Any suspicious activity flags are also sent to the relying party application 205 with the session ID and digital signature. At that time, the user is signed into the relying party application 205 based on the successful authentication of the user via the identity provider application 215.

Figure 4:
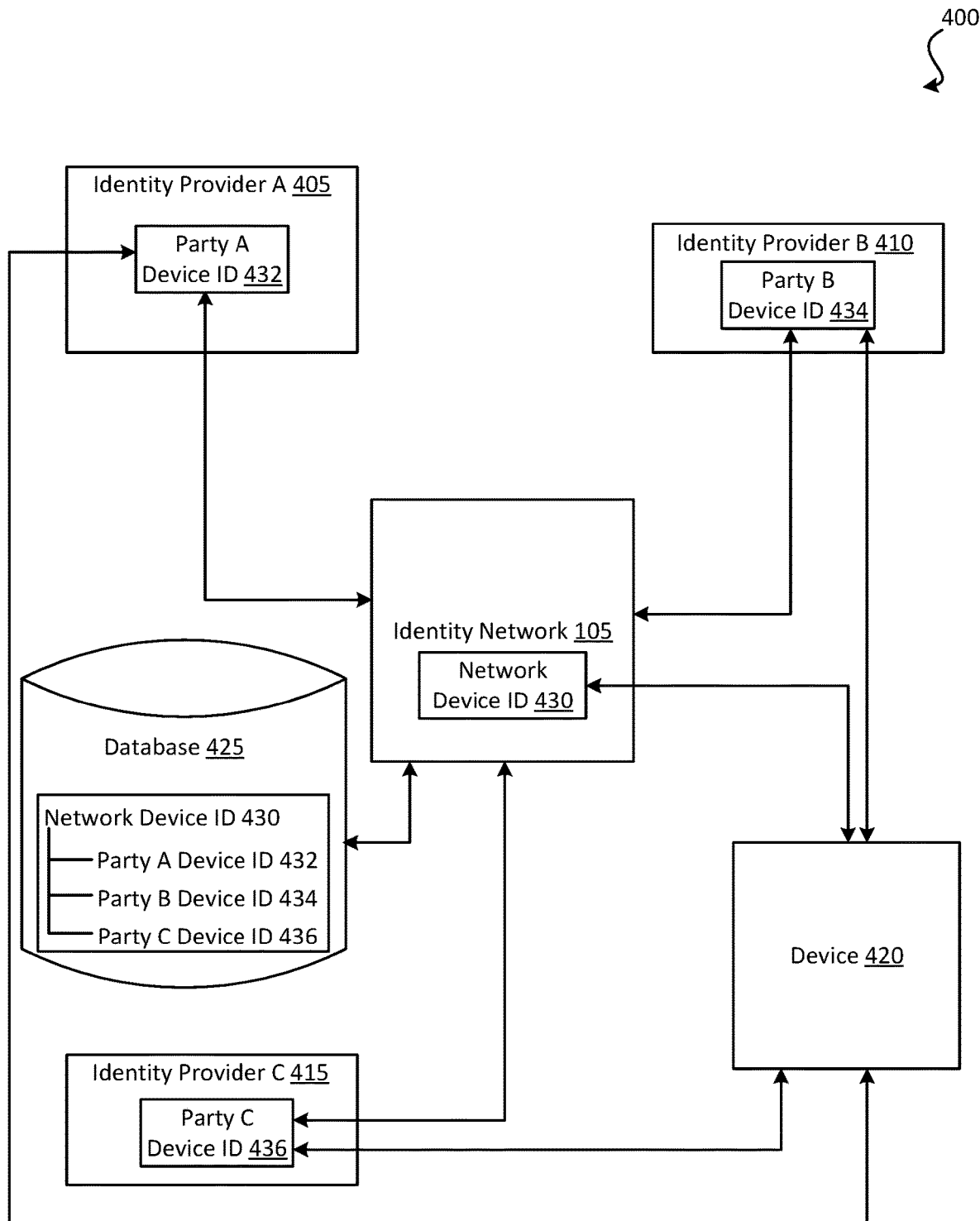
FIG. 4 illustrates an example common identifier data flow for identifying suspicious activity of a digital identity, according to an embodiment.

FIG. 4 illustrates a system 400 showing common device identifiers for a device 420, which can be used by the identity network 105 to identify, for example, suspicious activity of the device 420. The identity network 105 may have access to information about transactions of device 420 across many identity providers while each individual identity provider (405, 410, and 415) only has access to interactions with that identity provider. The identity network 105 has a more universal view that can be used as a benefit to both the identity providers and the user of the device 420. System 400 includes identity provider A 405, identity provider B 410, identity provider C 415, device 420, identity network 105, and database 425. While only three identity providers are depicted in FIG. 4, any number of identity providers may be included in system 400. Further, while a single device 420 is depicted, system 400 may include any number of devices. Additionally, while identity providers are listed, relying parties may also be included in addition to identity providers.

Identity providers A 405, B 410, and C 415 may each be a company subscribed to the identity network such as a relying party (e.g., relying party 110) or an identity provider (e.g., identity provider 120). For each identity provider 405, 410, and 415, the device 420 may have a device ID. For example, identity provider A 405 has assigned device 420 a locally unique identifier Party A Device ID 432. A different device will have a different device ID with identity provider A 405 than party A device ID 432. Similarly, identity provider B 410 may have assigned device 420 party B device ID 434, and identity provider C 415 may have assigned device 420 party C device ID 436. In this way, any activity performed between device 420 and identity provider A 405 will include party A device ID 432, any activity performed between device 420 and identity provider B 410 will include party B device ID 434, and any activity performed between device 420 and identity provider C 415 will include party C device ID 436.

Identity network 105 also has a unique device ID assigned to device 420. Network device ID 430 is the device ID assigned to device 420 by identity network 105. Any activity performed between identity network 105 and device 420 will include network device ID 430. Further, identity network 105 stores information in database 425 that links party A device ID 432, party B device ID 434, and party C device ID 436 with network device ID 430 so that identity network 105 may identify all known activity of device 420 to that single device 420.

In this way, when identity provider A 405 communicates with identity network 105 about an interaction with device 420, the information can include party A device ID 432. Identity network 105 can access database 425 to identify network device ID 430 based on the received party A device ID 432.

Identity network 105 may develop models of suspicious and normal activity for various users based on demographic and/or other data. Because identity network 105 can review all activity of device 420 with identity providers, the suspicious and normal activity models can be applied to the activity of device 420 to determine whether the device 420 activity is suspicious. If suspicious, identity network 105 can send an alert to the identity provider that may be interacting with device 420 currently or previously. Perhaps, for example, device 420 is a user's smartphone. If the user's smartphone is stolen and the thief accesses the user's accounts to make excessive purchases or transfer money out of the user's bank accounts, identity network 105 may identify the suspicious activity and notify identity providers that may be interacting with device 420. This not only protects the identity providers but the user as well from this type of criminal activity.

Figure 5:
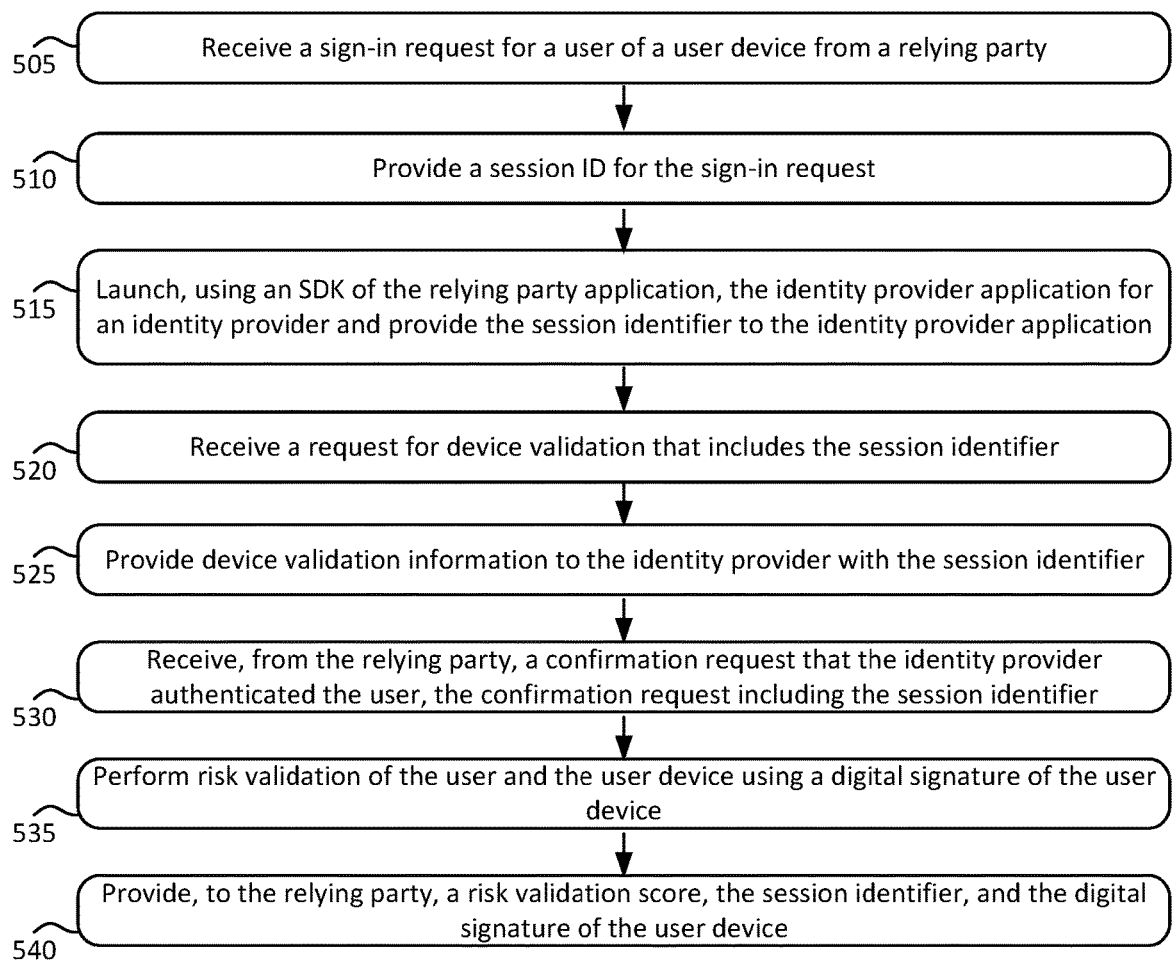
FIG. 5 illustrates an example method for providing an authenticated, universal digital identity for a user, according to an embodiment.

FIG. 5 illustrates a method 500 for using an authenticated digital identity in account sign-in. The method 500 can be performed by, for example, identity network 105. The method 500 begins at step 505 with receiving a sign-in request for a user of a user device from a relying party (e.g., relying party 110 or relying party application 205). The user may use a user device that has accessed the relying party in the past to create an account. The user device may be used to identify, by the identity network, the associated identity provider for the user. In response, the identity network provides a session ID for the sign-in request to the relying party at step 510.

The relying party application, using an identity network SDK, launches the identity provider application for an identity provider (e.g., identity provider 120) and provides the session identifier to the identity provider application at step 515. For example, the relying party app may be relying party app 205, and the identity provider may be identity provider 120. In some cases, a deep link or a QR code may be displayed by the relying party application after launching the identity provider application. The deep link or QR code can have the session ID embedded, and will be used later by the user to scan the QR code or deep link from within the identity provider application to obtain the sign-in request details from the identity network.

Once the identity provider application opens, the user may use the user's credentials for the identity provider to sign-in to the identity provider application. In response to sign-in, the identity network may receive a request for device validation from the identity provider at step 520. The identity network can validate the device based on checking the identifier with the sign-in information for the user to ensure the digital identity matches the device identifier. The identity network can provide a device validation result to the identity provider at step 525 based on the validation checking.

At step 530, the identity network receives a confirmation request from the relying party. The confirmation request can include a request for confirmation that the identity provider authenticated the user. The confirmation request may include the session ID. Upon receipt of the confirmation request, the identity network performs risk validation of the user and the user device using a digital signature of the user device at step 535. The risk validation can include checking for suspicious activity of the user device with respect to various relying parties, for example. The risk validation can also include a confidence value of whether the user performing the sign-in is the correct user for the digital identity and the actual owner of the user device. The risk validation may generate a score that indicates a confidence and/or flags suspicious activity for the relying party.

At step 540, the identity network provides the risk validation score, the session identifier, and the digital signature of the user device to the relying party. Upon receipt, the relying party can rely upon the authentication of the user via the identity provider or ask for additional sign-in credentials to confirm the user is authentic.

FIG. 6 illustrates a block diagram of an example computer system 600 usable for performing image analysis, normalization, and display. The computing device 600 can be or include, for example, a laptop computer, desktop computer, tablet, e-reader, smart phone or mobile device, smart watch, personal data assistant (PDA), or other electronic device.

The computing device 600 can include a processor 640 interfaced with other hardware via a bus 605. A memory 610, which can include any suitable tangible (and non-transitory) computer readable medium, such as RAM, ROM, EEPROM, or the like, can embody program components (e.g., instructions 615) that configure operation of the computing device 600. In some examples, the computing device 600 can include input/output ("I/O") interface components 625 (e.g., for interfacing with a display 645, keyboard, or mouse) and additional storage 630.

The computing device 600 can include network components 620. Network components 620 can represent one or more of any components that facilitate a network connection. In some examples, the network components 620 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 620 can be wired and can include interfaces such as Ethernet, USB, or IEEE 1394.

Although FIG. 6 depicts a single computing device 600 with a single processor 640, the system can include any number of computing devices 600 and any number of processors 640. For example, multiple computing devices 600 or multiple processors 640 can be distributed over a wired or wireless network (e.g., a Wide Area Network, Local Area Network, or the Internet). The multiple computing devices 600 or multiple processors 640 can perform any of the steps of the present disclosure individually or in coordination with one another.

Each of the instructions, calculations, or operations described herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like. The instructions or operations may be stored in the non-transitory memory or memory device and executed by the processor, which causes the processor to perform the instructions or operations described.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. In certain cases, method steps or operations may be performed or executed in differing order, or operations may be added, deleted, or modified. It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

It is to be understood that the figures and descriptions of embodiments of the invention have been simplified to illustrate elements that are relevant for a clear understanding of the invention. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted, or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

All patents, patent publications, patent applications, journal articles, books, technical references, and the like discussed in the instant disclosure are incorporated herein by reference in their entirety for all purposes.

What is claimed is:

1. A method for sign-in using a universal digital identity, the method comprising:
   receiving, at an identity network, a sign-in request for a user of a user device from a relying party;
   providing, by the identity network, a session identifier to the relying party;
   launching, by the identity network using a software development kit of a relying party application, an identity provider application of an identity provider, wherein launching the identity provider application comprises providing the session identifier;
   receiving, by the identity network from the identity provider, confirmation of a digital identity of the user including the session identifier and a digital signature of the user device;
   receiving, from the relying party, a confirmation request that the identity provider authenticated the user, the confirmation request including the session identifier; and
   in response to receiving the confirmation request, providing, by the identity network to the relying party, the session identifier, and the digital signature of the user device.

2. The method of claim 1, further comprising:
   receiving, at the identity network from the identity provider, a request for device validation that includes the session identifier; and
   providing, by the identity network, device validation information to the identity provider.

3. The method of claim 2, wherein providing device validation information to the identity provider comprises:
   identifying, by the identity network, a device identifier for the device; and
   providing, by the identity network, the device identifier and the session identifier to the identity provider.

4. The method of claim 1, further comprising:
   receiving, by the identity network, a detail request from the identity provider; and
   transmitting, by the identity network, details of the sign-in request to the identity provider.

5. The method of claim 1, further comprising:
   receiving, by the identity network via the software development kit of the relying party application, consent from the user.

6. The method of claim 1, further comprising:
   comparing, by the identity network, the digital signature of the user device with a stored digital signature for the user device; and
   transmitting, by the identity network to the identity provider, an indication of the comparison.

7. The method of claim 1, further comprising:
   performing, by the identity network, risk validation of the user and the user device using the digital signature of the user device; and
   transmitting, by the identity network to the relying party, a risk validation score with the session identifier and the digital signature of the user device.

8. The method of claim 7, wherein performing risk validation comprises:
   obtaining stored activity associated with the digital signature of the user device; and
   applying a model to the stored activity and sign-in request to generate the risk validation score.

9. The method of claim 7, wherein performing risk validation comprises:
   obtaining stored activity associated with the digital signature of the user device;
   applying a model to the stored activity and the sign-in request to generate a confidence value of the digital identity of the user; and
   transmitting, by the identity network, the confidence value with the session identifier and the digital signature of the user device to the relying party.

10. A system for sign-in using a universal digital identity, the system comprising:
    one or more processors; and
    a memory having stored thereon instructions that, upon execution by the one or more processors, cause the one or more processors to:
    receive a sign-in request for a user of a user device from a relying party;
    provide a session identifier to the relying party;
    launch, using a software development kit of a relying party application, an identity provider application of an identity provider, wherein launching the identity provider application comprises providing the session identifier;
    receive, from the identity provider, confirmation of a digital identity of the user including the session identifier and a digital signature of the user device;

receive, from the relying party, a confirmation request that the identity provider authenticated the user, the confirmation request including the session identifier; and in response to receiving the confirmation request, provide, to the relying party, the session identifier, and the digital signature of the user device.

11. The system of claim 10, wherein the instructions comprise further instructions that, upon execution by the one or more processors, cause the one or more processors to:

receive, from the identity provider, a request for device validation that includes the session identifier; and provide device validation information to the identity provider.

12. The system of claim 11, wherein the instructions for providing device validation information to the identity provider comprises instructions that, upon execution by the one or more processors, cause the one or more processors to:

identify a device identifier for the device; and provide the device identifier and the session identifier to the identity provider.

13. The system of claim 10, wherein the instructions comprise further instructions that, upon execution by the one or more processors, cause the one or more processors to:

receive a detail request from the identity provider; and transmit details of the sign-in request to the identity provider.

14. The system of claim 10, wherein the instructions comprise further instructions that, upon execution by the one or more processors, cause the one or more processors to:

receive, via the software development kit of the relying party application, consent from the user.

15. The system of claim 10, wherein the instructions comprise further instructions that, upon execution by the one or more processors, cause the one or more processors to:

compare the digital signature of the user device with a stored digital signature for the user device; and transmit, to the identity provider, an indication of the comparison.

16. The system of claim 10, wherein the instructions comprise further instructions that, upon execution by the one or more processors, cause the one or more processors to:

perform risk validation of the user and the user device using the digital signature of the user device; and transmit, to the relying party, a risk validation score with the session identifier and the digital signature of the user device.

17. The system of claim 16, wherein the instructions for performing risk validation comprises further instructions that, upon execution by the one or more processors, cause the one or more processors to:

obtain stored activity associated with the digital signature of the user device; and apply a model to the stored activity and sign-in request to generate the risk validation score.

18. The system of claim 16, wherein the instructions for performing risk validation comprises further instructions that, upon execution by the one or more processors, cause the one or more processors to:

obtain stored activity associated with the digital signature of the user device;

apply a model to the stored activity and the sign-in request to generate a confidence value of the digital identity of the user; and transmit the confidence value with the session identifier and the digital signature of the user device to the relying party.

19. A non-transitory, computer readable memory device having stored thereon instructions that, upon execution by one or more processors, cause the one or more processors to:

receive a sign-in request for a user of a user device from a relying party;

provide a session identifier to the relying party;

launch, using a software development kit of a relying party application, an identity provider application of an identity provider, wherein launching the identity provider application comprises providing the session identifier;

receive, from the identity provider, confirmation of a digital identity of the user including the session identifier and a digital signature of the user device;

receive, from the relying party, a confirmation request that the identity provider authenticated the user, the confirmation request including the session identifier; and in response to receiving the confirmation request, provide, to the relying party, the session identifier, and the digital signature of the user device.

20. The memory device of claim 19, wherein the instructions comprise further instructions that, upon execution by the one or more processors, cause the one or more processors to:

perform risk validation of the user and the user device using the digital signature of the user device; and transmit, to the relying party, a risk validation score with the session identifier and the digital signature of the user device.

* * * * *